United States Patent
Lunzer et al.

(10) Patent No.: US 11,535,770 B2
(45) Date of Patent: Dec. 27, 2022

(54) AQUEOUS COATING COMPOSITION FOR CORROSION PROTECTION

(71) Applicant: ALLNEX Austria GmbH, Werndorf (AT)

(72) Inventors: Florian Lunzer, Graz (AT); Armin Temel, Graz (AT); Gerald Hobisch, Hart Bei Graz (AT); Oliver Etz, Hunstetten (DE)

(73) Assignee: ALLNEX AUSTRIA GMBH, Werndorf (AT)

( * ) Notice: Subject to any disclaimer, the term of this patent is extended or adjusted under 35 U.S.C. 154(b) by 495 days.

(21) Appl. No.: 16/466,103

(22) PCT Filed: Jan. 16, 2018

(86) PCT No.: PCT/EP2018/050917
§ 371 (c)(1),
(2) Date: Jun. 3, 2019

(87) PCT Pub. No.: WO2018/130700
PCT Pub. Date: Jul. 19, 2018

(65) Prior Publication Data
US 2020/0071561 A1    Mar. 5, 2020

(30) Foreign Application Priority Data
Jan. 16, 2017 (EP) .................................. 17151694

(51) Int. Cl.
| | | |
|---|---|---|
| *C09D 163/00* | (2006.01) | |
| *C08J 3/00* | (2006.01) | |
| *C08L 63/00* | (2006.01) | |
| *C09D 5/08* | (2006.01) | |
| *C08K 5/00* | (2006.01) | |
| *C08K 5/20* | (2006.01) | |
| *C08L 61/12* | (2006.01) | |

(52) U.S. Cl.
CPC ............ *C09D 163/00* (2013.01); *C08J 3/005* (2013.01); *C08K 5/0025* (2013.01); *C08K 5/20* (2013.01); *C08L 61/12* (2013.01); *C08L 63/00* (2013.01); *C09D 5/08* (2013.01); *C08J 2363/00* (2013.01); *C08J 2461/10* (2013.01); *C08L 2201/54* (2013.01)

(58) Field of Classification Search
CPC .......... C09D 163/00; C09D 5/08; C08J 3/005; C08J 2363/00; C08K 5/0025; C08K 5/20; C08L 61/12; C08L 63/00; C08L 2201/54

USPC ........................................................ 523/402
See application file for complete search history.

(56) References Cited

U.S. PATENT DOCUMENTS

| | | | |
|---|---|---|---|
| 3,879,324 A | | 4/1975 | Timmons et al. |
| 3,947,425 A | * | 3/1976 | Freeman .................. C08G 8/16 528/127 |
| 4,026,857 A | | 5/1977 | Brown et al. |
| 4,048,179 A | | 9/1977 | Shen et al. |
| 4,179,440 A | | 12/1979 | Martinez |
| 4,415,682 A | | 11/1983 | Becker |
| 4,820,784 A | * | 4/1989 | Massingill, Jr. ...... C08G 59/226 525/481 |
| 4,886,845 A | | 12/1989 | Becker et al. |
| 4,889,890 A | | 12/1989 | Kerr et al. |
| 5,177,161 A | | 1/1993 | Gräff et al. |
| 6,046,256 A | | 4/2000 | Nakamura et al. |
| 2003/0149169 A1 | * | 8/2003 | Bammel ................. C09D 5/088 524/611 |
| 2008/0214716 A1 | * | 9/2008 | Weiss ................... C08L 2666/04 524/424 |
| 2009/0253860 A1 | | 10/2009 | Bimbrich et al. |
| 2010/0129659 A1 | | 5/2010 | Nemoto et al. |
| 2015/0079402 A1 | * | 3/2015 | Tang ...................... B65D 25/34 523/402 |
| 2015/0147501 A1 | | 5/2015 | Lindenmuth et al. |

FOREIGN PATENT DOCUMENTS

| | | |
|---|---|---|
| DE | 19756749 | 12/1997 |
| JP | 51-84825 | 7/1976 |
| JP | 2-3457 | 1/1990 |
| JP | 8-253552 | 10/1996 |
| JP | 8-319339 | 12/1996 |
| JP | 9-169854 | 6/1997 |
| WO | 2013/191826 | 12/2013 |
| WO | 2015/093299 | 6/2015 |

OTHER PUBLICATIONS

International Search Report dated Apr. 11, 2018 in International Application No. PCT/EP2018/050917.
Written Opinion of the International Searching Authority dated Apr. 28, 2018 in International Application No. PCT/EP2018/050917.

* cited by examiner

*Primary Examiner* — David T Karst
(74) *Attorney, Agent, or Firm* — Wenderoth, Lind & Ponack, L.L.P.

(57) ABSTRACT

The invention relates to an aqueous resin dispersion D comprising a mixture of a hydrophilically modified epoxy-based resin P and a resole R, and a co-crosslinker E, to a process for the preparation of the aqueous resin dispersion D, and to a method of use thereof to prepare coating films to prevent corrosion of the coated substrate.

10 Claims, No Drawings

AQUEOUS COATING COMPOSITION FOR CORROSION PROTECTION

FIELD OF THE INVENTION

The present invention relates to an aqueous coating composition for corrosion protection, to a process for its preparation, and to its use in coating of metals.

BACKGROUND OF THE INVENTION

Most metals, with the exception of noble metals or those metals that form coherent oxide layers such as aluminium, are provided with coating films when exposed to ambient conditions to prevent, or at least retard, corrosion. Application of a coating film onto a metal surface provides a barrier between the metal substrate and a damaging environment if there is sufficient adhesion of the coating film to the metal substrate, and if the permeability of the coating film for oxygen and water is low. Among coating films, paints in liquid form or powder form play an important role. An aspect which has to be considered when selecting a coating material is avoiding of constituents in the coating composition that can react with the metal surface, and thus possibly damage the metal substrate, for example chloride ions which may provide a seed for future corrosive attack.

Many organic polymers are suitable for forming coating films on a metal surface. It is desired that these films have a sufficient hardness, sufficient adhesion as pointed out supra, and also sufficient elasticity to enable the coating film to follow possible deformations of the coated metal items. Epoxy resins are one of the most-used materials in the formulation of corrosion-protection paints (High-Performance Coatings, 2008, ed. A. S. Khanna, "the word epoxy has become synonymous with anti-corrosion in today's industrial environment"). Reaction products made from epoxy resins and amines have become the standard material in cathodic electrocoating of vehicle bodies.

In WO 2015/093 299 A1, an aqueous resin composition (D) is disclosed which is obtained by dispersing a vinyl ester resin (A) and a urethane resin (B) having an aromatic ring in an aqueous medium (C), and adding thereto a carbodiimide crosslinking agent (E). The vinyl ester resin (A) is made by reacting a polymerisable ethylenically unsaturated acid compound (a2) with at least one epoxy resin (a1) selected from the group consisting of a novolac type epoxy resin and a bisphenol type epoxy resin. The urethane resin (B) is obtained by reacting a polyol (b1-1) having an aromatic ring and a polyol (b1-2) having a hydrophilic group which is preferably an anionic group, with a polyisocyanate (b2). The carbodiimide crosslinking agent (E) preferably has two or more carbodiimide groups per molecule.

In US 2010/0 129 659 A1, a coated product is disclosed made by a 3-coat 1-bake method; the method including the steps of forming cured coating film (A1) from a cationic electrodeposition coating composition (A) on a metal object to be coated; forming a first coloured coating film (B1) by applying thereon a first coloured aqueous coating composition (B); forming a second coloured coating film (C1) by coating a second coloured aqueous coating composition (C) on uncured first coloured coated film (B1); forming a clear coating film (D1) by applying a clear coating composition (D) on the uncured second coloured coated film (C1); and simultaneously curing uncured first coloured coated film (B1), uncured second coloured coating film (C1), and uncured clear coating film (D1). The cationic electrodeposition coating composition (A) contains cationic amino group-containing modified epoxy resin (a1) wherein the modification is made by addition of a xylene formaldehyde resin which is made by condensing xylene and phenols with formaldehyde in the presence of an acidic catalyst, which modification renders plasticity and hydrophobicity to the epoxy resin. The aqueous coating composition (B) is preferably made from a base resin such as acrylic resin, polyester resin, alkyd resin, which have a cross-linkable functional group such as hydroxyl, carboxyl, carbonyl, amino, in mixture with a cross-linking agent such as melamine resin, urea resin, (blocked) polyisocyanate compounds, carbodiimide compounds. The aqueous coating composition (C) is preferably composed of a base resin such as polyester resin, acrylic resin, alkyd resin, urethane resin, epoxy resin, which have a crosslinkable functional group such as carboxyl, hydroxyl, carbonyl, amino, and a cross-linking agent such as polyisocyanate compounds which may be blocked, melamine resin, urea resin, carbodiimide compound, hydrazide, semicarbazide, epoxy resin. The clear coating composition (D) may be solvent-based or aqueous, and is made by mixing a base resin which is preferably an acrylic resin, a polyester resin, an alkyd resin, a urethane resin, or an epoxy resin, which have a crosslinkable functional group such as hydroxyl, carboxyl, epoxy, and as cross-linking agents, a melamine resin, a urea resin, a polyisocyanate compound which may be blocked, a carboxyl-containing compound or resin, an epoxy-containing compound or resin.

In WO 2013/191 826 A1, an aqueous mixture is disclosed which comprises an aqueous polyolefin dispersion comprising the melt blending product of one or more base polymers and one or more stabilizing agents in the presence of water and optionally one or more neutralising agents, wherein the polyolefin dispersion has an average volume particle size diameter in the range of from 400 nm to 1500 nm, and a pH range from 8 to 11; and one or more crosslinking agents selected from the group consisting of phenol-formaldehyde resins, hydroxyalkylamide resins, amino-formaldehyde resins, epoxy group containing resins, and combinations thereof, wherein said crosslinking agents are present in the dispersion with mass fractions of from 0.1% to 50%, based on the mass of solids of the dispersion; wherein said aqueous based blend composition has a mass fraction of solids in the range of from 15% to 70%, based on the mass of the aqueous based blend composition, wherein the mass fraction of the one or more base polymers in the solids of said blend composition is up to 99.9%, based on the mass of solids of the aqueous based blend composition, and a pH in the range of from 8 to 11. The aqueous crosslinking agents having epoxide groups are glycidyl ethers of alcohols, mentioned are sorbitol polyglycidyl ether, glycerol triglycidyl ether, polyglycerol polyglycidylether, trimethylolpropane triglycidyl ether, poly(ethyleneglycol) diglycidyl ether, poly(propyleneglycol) diglycidyl ether, the glycidyl ether of ethoxylated phenol, and the glycidyl ether of ethoxylated lauryl alcohol. Further epoxide-functional compounds mentioned are a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxide groups in its molecules. Such resins can be obtained for example under the tradenames of XZ 92533.00, XZ 92598.00 and XZ 92446.00 from The Dow Chemical Company.

In can coating applications, water-reducible paints were used, based on condensation products of bisphenol A epoxy resins of type 7 and phenol-based novolaks which were methylolated and afterwards, reacted with sodium monochloroacetate, and then dispersed in water. See U.S. Pat. No. 5,177,161 A. The epoxy resin and novolak moieties are connected via an ether linkage.

Other water-reducible can coating resins which are based on addition products of carboxylated novolaks A and epoxy resins B have been known from DE 197 56 749 B4. These addition products have at least one ester group per molecule which is formed by reaction of a carboxyl group of the novolak A and an epoxide group of the epoxy resin B. These products have lighter colour than those according to U.S. Pat. No. 5,177,161 A.

The presence of acidic groups in these formulations is needed to ensure water dispersibility. However, it has been found that the corrosion resistance of steel plates with coating films according to this state of the art is still not satisfactory.

SUMMARY OF THE INVENTION

It was therefore an object of the present invention to provide a coating composition with improved corrosion resistance properties compared to the state of the art.

This object has been realised by an aqueous resin dispersion which comprises a mixture of a hydrophilically modified epoxy resin and a resole, and a co-crosslinker which is able to esterify acidic groups present in this dispersion during the curing reaction. Such acidic groups may stem from the hydrophilically modified resin which is preferably epoxy-based, if it bears anionic groups to provide self-emulsification, or from additives or catalysts bearing acid functional groups which are present in the dispersion.

The present invention therefore relates to an aqueous resin dispersion D comprising a mixture of a hydrophilically modified epoxy-based resin P, a resole R, and a co-crosslinker E. The hydrophilically modified epoxy-based resin P is selected from the group consisting of an anionically modified epoxy-based resin Pa which resin is self-emulsifying due to the anionic hydrophilic modification, a non-ionically modified epoxy-based resin Pn which resin is self-emulsifying due to the non-ionic hydrophilic modification, and a hydrophilically modified epoxy-based resin Pan that has both anionic and non-ionic hydrophilic groups. The co-crosslinker E is preferably selected from the group consisting of
a compound E1 having at least two hydroxyl groups that react with acid compounds present in the coating composition at a temperature above 80° C. under ester formation and liberation of water, and
an ester E2 with at least two ester groups formed by an at least dihydric alcohol E22 and an acid E21 which acid is unstable at a temperature above 80° C.

DETAILED DESCRIPTION OF THE PREFERRED EMBODIMENTS

The hydrophilically modified epoxy-based resin P is preferably an anionically modified epoxy-based resin Pa which resin is self-emulsifying due to the anionic hydrophilic modification or a non-ionically modified epoxy-based resin Pn which resin is self-emulsifying due to the non-ionic hydrophilic modification. It is also possible to use a hydrophilically modified epoxy-based resin Pan that has both anionic and non-ionic hydrophilic groups.

In a less preferred embodiment, it is also possible to use externally emulsified epoxy-based resins P which are rendered hydrophilic by addition of emulsifiers. Preferably, these emulsifiers are made compatible with epoxy resins by appropriate modification, preferably by reacting emulsifiers having epoxide-reactive groups with bisphenol A diglycidyl ether, or low molar mass liquid epoxy resins.

One of the characteristics of the epoxy resin P of this invention is that all variants Pa, Pn, and Pan are always made by a reaction or by a sequence of reactions which includes at least one advancement reaction, also referred to as fusion reaction, viz., a reaction where a phenolic compound having phenolic hydroxyl groups is reacted with a compound having at least two reactive epoxide groups of formula

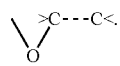

The anionically modified epoxy-based resin Pa is preferably derived from a novolak N and an at least difunctional epoxide compound E having glycidyl ether functional groups.

The use of surfactants to prepare epoxy resin dispersions has been described in the literature, such as anionic surfactants that are acid derivatives of epoxy resins (see, e. g., U.S. Pat. No. 4,179,440 A), non-ionic surfactants based on polyoxyalkylene diols (see, e.g., U.S. Pat. No. 4,026,857 A), and cationic quaternary amine surfactants (see, e.g., U.S. Pat. No. 3,879,324 A).

Non-ionic hydrophilic groups are preferably groups derived from oligomeric or polymeric oxyethylene moieties. Copolymers or co-oligomers having oxyethylene and oxypropylene moieties can also be used. These hydrophilic groups can be incorporated into an epoxy resin by reacting hydroxy-functional oxyalkylene oligomers or polymers directly with diepoxides, such as the diglycidylether of bisphenol A, with Lewis acid catalysts (see, e.g., U.S. Pat. No. 4,886,845 A), or preparing other reactive derivatives of oxyalkylene oligomers or polymers and reacting these together with diphenols and diepoxides (see, e.g., US 2009/0 253 860 A1).

Preferred self-emulsifying epoxy-based resins are those based on reaction products of polyethylene glycol and diepoxides, such as disclosed in U.S. Pat. No. 4,415,682 A. This patent discloses low-solvent, stable aqueous dispersions comprising (a) a mass fraction of from 35% to 65% of an epoxy resin which has an average specific amount of substance of epoxide groups of from 200 mmol/kg to 4000 mmol/kg ("epoxy equivalent weight" of from 250 g/mol to 5000 g/mol), (b) a mass fraction of from 2% to 20% of a non-ionic dispersant which is an addition product of (b1) polyoxyalkylene glycols having a number-average molar mass of from 200 g/mol to 20 kg/mol, and (b2) glycidyl ethers of polyhydric phenols having a specific amount of substance of epoxide groups of from 500 mmol/kg to 10 000 mmol/kg ("epoxy equivalent weight" of from 100 g/mol to 2000 g/mol), wherein the ratio of the amount of substance n(OH) of hydroxyl groups in the polyoxyalkylene glycols to the amount of substance n(EP) of epoxide groups in the glycidyl ethers of polyhydric phenols, n(OH)/n(EP), is from 1 mol/0.85 mol to 1 mol/1.5 mol, (c) a mass fraction of from 0.2% to 20% of an organic solvent having a boiling temperature of less than 160° C., and (d) a mass fraction of from 35% to 60% of water.

A dispersion of an at least partially neutralised anionically modified epoxy-based resin Pa is made by at least partially neutralising the acid groups of the product of a first multi-step process or of a second multi-step process by addition of an appropriate amount of a base, wherein
the first multi-step process comprises the following steps a, b, c, d, e, and f:

in step a, a novolak N is prepared from a phenol N1 and formaldehyde F under acid catalysis, and unreacted phenol N1 is separated from the reaction product of step a, in step b, the novolak N is subjected to an advancement reaction under catalysis by adding an epoxy resin E having on average at least two functional epoxide groups per molecule, in step c, the reaction product of step b is dissolved in an organic solvent to form a solution, wherein the solvent is preferably selected from the group consisting of linear or branched aliphatic alcohols, linear or branched aliphatic ethers, linear or branched aliphatic ketones, and mixtures of these with aromatic hydrocarbons, the solution of the reaction product of step c is then reacted in step d with formaldehyde in the presence of alkali, to form methylol compounds, in step e, after addition of further alkali, a halogenalkanoic acid is added, and after complete reaction of the halogenalkanoic acid, the reaction product of this step e is purified by acidification with aqueous acid, the organic layer which contains the reaction product is separated and the separated solution is washed with distilled water, and in step f, the purified reaction product of step e is freed from solvent by distillation under reduced pressure, and water and a tertiary amine as neutralisation agent are then added to obtain an aqueous solution where only small amounts of the solvents remain, and the second multi-step process comprises the following steps A, B, and C:

in step A, an ester Q of a phosphorus-based acid Q1 and an epoxide-functional compound Q2 having at least one epoxide group per molecule is prepared, wherein the phosphorus-based acid used in step A has at least two acidic hydrogen atoms per molecule, and is selected from the group consisting of inorganic acidic phosphorus compounds, and organic acidic phosphorus compounds, and the epoxide-functional compound used in step A is an epoxide compound having at least two epoxide groups per molecule, and wherein the reaction of step A is conducted in a way that the ester Q produced by the reaction of step A has a specific amount of epoxide groups which is not higher than 0.1 mol/kg, and on average, at least one acidic hydrogen atom per molecule, in step B, an advancement reaction is conducted with an at least difunctional epoxide S1, and an aromatic dihydroxy compound S2, in the presence of a catalyst, to yield a polyether compound S having epoxide groups, in step C, the polyether compound S of step B is dissolved in a solvent, and the ester Q made in step A is added under stirring until a homogeneous mixture is obtained, which mixture is then freed from solvents by distillation under reduced pressure.

In a preferred embodiment, in step a, a novolak N is prepared from a phenol N1 and formaldehyde F under acid catalysis, preferably with a stoichiometric excess of phenol N1 to formaldehyde F: $n(N1) \geq n(F) \cdot 1.5$, where $n(N1)$ is the amount of substance of the phenol N1, and $n(F)$ is the amount of substance of formaldehyde F, and the phenol N1 is preferably selected from the group consisting of phenol (hydroxybenzene), 2-alkylphenol, and 4-alkylphenol, and mixtures of these, where the alkyl group is independently selected from linear or branched alkyl groups preferably having from one to twenty carbon atoms. Minor amounts of 2,4-dialkylphenols and 2,6-dialkylphenols can be present as chain stoppers. The novolak N thus obtained has preferably a number average degree of polymerisation, expressed as average number of phenol moieties in one molecule of the novolak N, of from 3 to 20.

After separation of unreacted phenol N1 from the reaction product of step a, the novolak N is subjected in step b to an advancement reaction under catalysis, preferably with amines or phosphines as catalyst, by adding an epoxy resin E having on average at least two functional epoxide groups per molecule, preferably an epoxy resin based on bisphenol A, having a specific amount of epoxide groups $n(EP)/m$, of preferably from 500 mmol/kg to 650 mmol/kg. In this context, $n(EP)$ is the amount of substance of epoxide groups present in the epoxy resin under consideration, and m is the mass of said epoxy resin. The reaction is preferably conducted until all epoxide groups E have been consumed. The reaction of step b is preferably conducted in the melt.

In step c, the reaction product of step b is dissolved in an organic solvent which is selected from the group consisting of aliphatic alcohols, aliphatic ethers, aliphatic ketones, and mixtures of these with aromatic hydrocarbons. The aliphatic alcohols are linear or branched and preferably have from four to twelve carbon atoms. The aliphatic ethers are linear or branched, have preferably six to twenty carbon atoms, and are preferably monethers or diethers of alkanols preferably having from one to eight carbon atoms, and alkanols or alkanediols preferably having from two to twelve carbon atoms. The aliphatic ketones are linear or branched and preferably have from three to ten carbon atoms. The aromatic hydrocarbons are preferably alkylaromatic compounds, preferred are toluene, xylene, and ethylbenzene. The solution of reaction product of step b is then reacted in step d with formaldehyde in the presence of alkali, to form methylol compounds. Formaldehyde is preferably used in less than stoichiometric ratio, i. e. the amount of substance of formaldehyde is less than the amount of substance of aromatic moieties (benzene rings) in the reaction product of step b. After addition of further alkali, a halogenalkanoic acid, preferably 2-chloroacetic acid, is added in step e, preferably in less than stoichiometric ratio, i. e., the amount of substance of halogenalkanoic acid is less than the amount of substance of aromatic moieties (benzene rings) in the reaction product of step b and less than the amount of substance of methylol groups in the reaction product of step d. After complete reaction of the halogenalkanoic acid, the reaction product of this step e is purified by acidification with aqueous acid, separation of the organic layer which contains the reaction product, and washing of the separated solution with distilled water.

In step f, the purified reaction product of step e is freed from the solvent by distillation under reduced pressure, and water and a tertiary amine as neutralisation agent are then added to obtain an aqueous solution where only small amounts of the solvents remain.

A further preferred way to prepare a dispersion of an anionically modified epoxy-based resin Pa comprises two reaction steps, where an ester of a phosphorus-based acid and an epoxide-functional compound having at least one epoxide group per molecule is prepared in step A. The phosphorus-based acid used in step A has at least two acidic hydrogen atoms per molecule, and is selected from the group consisting of inorganic acidic phosphorus compounds, and organic acidic phosphorus compounds. The former group comprises ortho-phosphoric acid $H_3PO_4$, diphosphoric acid $H_4P_2O_7$, triphosphoric acid $H_5P_3O_{10}$ and their higher homologues (oligomers), phosphorous acid $H_3PO_3$, diphosphorous acid $H_4P_2O_5$ and their higher homologues, and hypophosphorous acid $H_3PO_2$ and their higher homologues. Particularly preferred are ortho-phosphoric acid, mixtures of di- and higher oligomers of ortho-phosphoric acid, phosphorous acid, and higher oligomers thereof. The latter group comprises phosphonic acids which are selected from the group consisting of alkanephosphonic acids, $R^1$—$PO_3H_3$, aromatic phosphonic acids $R^2$—$PO_3H_3$, and the corresponding phosphonous acids $R^1$—$PO_2H_2$ and $R^2$—$PO_2H_2$, where $R^1$ is a linear, branched or cyclic alkyl having from one to twenty carbon atoms, and $R^2$ is an optionally substituted aromatic group having from six to twenty carbon atoms. Particularly preferred are methanephosphonic acid and benzenephosphonic acid.

The epoxide-functional compound used in step A is preferably a glycidylether of a phenolic compound, preferably bisphenol A diglycidylether or bisphenol F diglycidylether, or an oligomeric or polymeric epoxy resin based on these bisphenols.

The reaction in step A is conducted in a way that the product of step A has a specific amount of epoxide groups which is not higher than 0.1 mol/kg, and on average, at least one acidic hydrogen atom per molecule. The ratio between the amount of substance of acidic hydrogen atoms in the phophorus-based acid and the amount of substance of epoxide groups of the epoxide-functional compounds in step A is preferably between 0.3 mol/mol and 0.9 mol/mol. The acid number of the adducts prepared in step A is preferably from 5 mg/g to 200 mg/g, particularly preferred from 8 mg/g to 180 mg/g, and especially preferred, from 10 mg/g to 160 mg/g.

In step B, an advancement reaction is conducted with an at least difunctional epoxide, an aromatic dihydroxy compound, and preferably, also a dimeric fatty acid, in the presence of an amine or a phosphine catalyst. The stoichiometry is preferably chosen in a way that the ratio of the amount of substance of epoxide groups to the amount of substance of phenolic hydroxyl groups is from 2 mol/mol to 1.1 mol/mol. The ratio of the amount of substance of epoxide groups to the amount of substance of acidic hydrogen atoms in the dimer fatty acid is preferably from 25 mol/mol to 10 mol/mol.

Other components than the optional dimeric fatty acid may also be present in the advancement reaction. Such additional components are selected from the group consisting of monofunctional phenols which act as chain terminators, fatty acid amides, fatty acid amido-amines, amines having at least two amino groups per molecule, and from three to twenty carbon atoms, wherein the amino groups are at least two primary amino groups, at least one primary and at least one secondary amino group, or at least two secondary amino groups, amines which have from three to twenty carbon atoms and at least one secondary amino group per molecule, and optionally, at least one further reactive group which is preferably a hydroxyl group, and amines having from four to twenty carbon atoms and at least one tertiary, and at least one primary amino group per molecule, fatty acids having from six to thirty carbon atoms, and one carboxylic acid group, or mixtures of two or more of such fatty acids.

The product of step B has preferably a specific amount of substance of epoxide groups of from 0.5 mol/kg to 2.5 mol/kg.

In step C, the product of step B is dissolved in a solvent which is preferably an alcohol solvent or an etheralcohol solvent, and the product of step A is added under stirring until a homogeneous mixture is obtained. This mixture is then freed from solvents by distillation under reduced pressure.

The nonionically modified epoxy-based resin Pn is made by
 synthesis of an emulsifier F which has a nonionic portion which comprises a polyoxyethylene homopolymer or copolymer segment or a sugar alcohol segment, and a non-hydrophilic and compatibilising portion which comprises building blocks derived from epoxide compounds which are at least difunctional, by coupling of the at least difunctional epoxide compounds with hydroxy-functional polyoxyethylene homopolymers or hydroxy-functional polyoxyethylene copolymers or with sugar alcohols catalysed with strong Brønsted acids or Lewis acids, or with epoxide-functional polyoxyethylene homopolymers or epoxide-functional polyoxyethylene copolymers or with epoxide-functional sugar alcohols,
 incorporation of the emulsifier F into an epoxy resin via an advancement reaction with a diepoxide A1, a dihydric aromatic compound A2, and the emulsifier F of the previous step, in the presence of a phosphine or amine catalyst, wherein the stoichiometry is chosen such that the advancement reaction product has epoxide end groups.

In a preferred embodiment, the polyoxyethylene segment has an amount of substance fraction of at least 50%, more preferred, at least 60%, and most preferred, at least 80%, of oxyethylene moieties, together with oxypropylene moieties. Oxyethylene homopolymers are particularly preferred.

The oxyethylene segment or the sugar alcohol segment are chemically bound to a non-hydrophilic and compatibilising portion which comprises building blocks derived from epoxide compounds which are at least difunctional, preferably bisphenol A diglycidyl ether, or oligomers thereof.

Coupling of the epoxide compounds with the hydroxy-functional alcohols can be catalysed with strong Brønsted acids or Lewis acids, preferably, tetrafluoroboric acid $HBF_4$, boron trifluoride $BF_3$, or its complexes with dialkylethers or amines.

Coupling with sugar alcohols, preferably sucrose, can be made via the allyl ether or methallyl ether or crotonylester which are then epoxidised, and can be coupled to bisphenol A diglycidylether in an advancement reaction. The diepoxide compounds are preferably used in stoichiometric excess.

This emulsifier is then incorporated into an epoxy resin via an advancement reaction with a diepoxide, a dihydric aromatic compound, and the emulsifier detailed in the preceding paragraph, in the presence of a phosphine catalyst or an amine catalyst, preferably triphenylphosphine. The stoichiometry is preferably chosen such that the specific amount of epoxide groups of the advancement reaction product Pn is between 0.5 mol/kg and 2.5 mol/kg.

Sugar alcohols are compounds of formula $HO-CH_2-[-CH(OH)]_n-CH_2-OH$ where n is an integer number of from 1 to 24, or ethers derived therefrom; commonly known compounds include glycerol, erythritol, threitol, arabitol, xylitol, ribitol, mannitol, sorbitol, galactitol, fucitol, iditol, inositol, volemitol, isomalt, maltitol, lactitol, maltotriitol, and maltotetraitol.

Hydrophilically modified epoxy-based resins Pan that have both anionic and non-ionic hydrophilic groups are preferably prepared by mixing an anionically modified epoxy-based resin Pa and a non-ionically modified epoxy-based resin Pn. Preferably, the mixing ratio is chosen such that the mass ratio m(Pa)/m(Pn) of the resins Pa and Pn is from 0.2/0.8 to 0.8/0.2. The mass of resin Pa is m(Pa), and the mass of resin Pn is m(Pn).

The resole R is made in the known way from a phenol compound having at least one phenolic hydroxyl group, and formaldehyde in stoichiometric excess, under alkali catalysis, and heating. Stoichiometric excess can usually be up to a ratio n(FA)/n(PC)=4 mol/mol of amounts of substance of formaldehyde, n(FA), and amount of substance of phenolic compounds, n(PC). Characteristic for a resole R is the presence of methylol groups —$CH_2OH$ chemically bound to aromatic rings of the phenol compounds in the ortho position and/or the para position to a phenolic hydroxyl group. After completion of the reaction, water and unreacted phenol are removed by distillation under reduced pressure, and the remaining alkali is neutralised by acid addition. Alcohol is added, and the mixture is heated whereby at least a part of the methylol groups are etherified. Salt, residual solvent, and water is then removed by filtration and distillation. Preferably, the resole R is based on a dihydric phenol, particularly preferred, on bisphenol A or bisphenol F. It is also possible to use mixtures of monohydric phenols, particularly phenol, o-cresol, p-cresol, and homologues thereof such as ethylphenol, t-butylphenol, or nonylphenol, and dihydric phenols.

The resole R is a crosslinker for the epoxy-based resin P. It reacts by formation of ether groups between the alkoxymethyl groups and methylol groups of the resole by transetherification and etherification with the secondary aliphatic hydroxyl groups of the epoxy-based resin.

Preparation of the mixtures of the hydrophilically modified epoxy-based resins P with the resole R is preferably performed by charging the resins P and R, optionally adding a basic neutralisation agent if an anionically modified resin Pa is used, adding water and optionally, an ether alcohol, preferably an ethylene glycol monoether, and stirring until a macroscopically homogeneous dispersion is obtained, and then cooling to ambient (25° C.) or slightly elevated (50° C.) temperature.

The co-crosslinker E is preferably at least difunctional and is either a compound E1 having at least two hydroxyl groups that react with acid compounds present in the coating composition at elevated temperature (above 80° C.) under ester formation and liberation of water, or it is a ester E2 with at least two ester groups formed by an at least dihydric alcohol E22 and an acid E21 which is unstable at elevated temperature (above 80° C.). The crosslinking reaction in this case is a metathesis reaction between the ester E2 and the acid compounds present in the coating composition, under formation of esters of the at least dihydric alcohol E22 and the said acid compounds, and liberation of the acid E21 which decomposes, in the case of a β-ketoacid E21, to a ketone and carbon dioxide. Useful compounds E2 have the general formula $(R^1—C(=O)—CR^2R^3—C(=O)—O—)_xR^4$, where $R^1$ is an alkyl group having from one to eight carbon atoms, $R^2$ and $R^3$ are independently from each other hydrogen, or an alkyl group having from one to eight carbon atoms, and $R^4$ is the residue of an aliphatic alcohol having from two to four hydroxyl groups, and from two to forty carbon atoms, preferably these are ethylene glycol bis-acetoacetate, diethylene glycol bis-acetoacetate, propylene glycol bis-acetoacetate, 1,4-butanediol bis-acetoacetate, 2,2,4-trimethylpentanediol bis-acetoacetate, and the bis-acetoacetate of a mixture of dimer fatty alcohols, glycerol tris-acetoacetate, trimethylolpropane tris-acetoacetate, and the corresponding diesters of 3-oxovaleric acid, 3-oxocaproic acid, 3-oxoenanthic acid, 2-methyl acetoacetic acid, 2,2-dimethyl acetoacetic acid, 2-ethyl acetoacetic acid, and 2-methyl-2-ethyl acetoacetic acid. Some of these compounds are disclosed in EP 0 971 989 B1 as adhesion promotors of coating film to a substrate.

A preferred example of the first class of compounds E1 is a β-hydroxyalkylamide of an organic carboxylic acid having at least two β-hydroxyalkylamide groups. This class of compounds has been used as crosslinker for powder coatings, see A. Kaplan, European Coatings Journal 1998, p. 448 to 452 "Polyester/β-hydroxyalkylamide powder coatings". They have also been used as sole crosslinkers for acrylic copolymers which are made with maleic anhydride or methacrylic acid or acrylic acid as comonomers, see U.S. Pat. Nos. 4,076,917, and 5,266,628. In U.S. Pat. No. 5,266,628, the influence of the ratio of the number N(OH) of hydroxyalkyl groups in the β-hydroxyalkylamide to the number N(COOH) of carboxyl groups in the acrylic copolymer has been investigated. The results show that unfavourable results for appearance of the coating film and adhesion thereof to metal substrates (tin-plated steel of beverage cans) are obtained if the ratio N(OH)/N(COOH) was less than or equal to 0.2 and higher than or equal to 0.69, with only a small window at a ratio of 0.44 where there were no appearance defects, and no adhesion failures. The use of this class of compounds as co-crosslinker in aqueous coating compositions comprising polymers other than acrylic copolymers has not been disclosed. It was found in the experiments underlying the present invention that acid groups present in a liquid coating composition can effectively be converted to esters during curing by these co-crosslinkers. The minimum temperature needed has been found to be 100° C., preferably, 120° C., and more preferred, 150° C., for about thirty minutes. This conversion does not only increase the resistance against hydrolysis, but surprisingly, also improves the corrosion resistance of coatings prepared with liquid coating compositions where acid groups are present in the binder components or in additives, particularly rheological additives, or adjuvants such as catalysts and biocides. Particularly preferred are β-hydroxy-alkylamides of aliphatic dicarboxylic acids, and especially preferred, the materials N,N,N',N'-tetrakis-(2-hydroxyethyl)-adipamide and N,N,N',N'-tetrakis-(2-hydroxypropyl)-adipamide, (commercially available from Ems-Chemie AG, Switzerland, under the trade names ®Primid XL552 and ®Primid QM-1260).

The aqueous resin dispersion D has preferably a pH of 7.5 or lower. Coating compositions are prepared from the aqueous resin dispersion D comprising a mixture of a hydrophilically modified epoxy-based resin P and a resole R, and a co-crosslinker E, preferably by adding one or more of an aliphatic alcohol, or mixture of such alcohols, and additives which are preferably selected from the group consisting of a rheological additive, a levelling agent, a defoamer, and a melamine-based aminoplast crosslinker together with an acid catalyst. Wetting agents and anti-settling agents can also be used if pigmented coating compositions are prepared.

Useful rheology additives and thickeners frequently comprise chemical compounds that have acid groups, such as in acrylic copolymer thickeners. It is also possible to use thickeners based on renewable resources, such as cellulose derivatives including carboxymethylcellulose, hydroxyethylcellulose, hydroxypropyl methylcellulose, polysaccharides such as starches, vegetable gums, and polyuronides, or proteins such as casein.

Preferably, the rheological additive is an inorganic thickener selected from the group consisting of silica and layer silicates, both of which may be organically modified, an organic synthetic thickener selected from the group consisting of polyvinyl alcohols, polyacrylamides, polyvinyl pyrrolidone, polyethylene oxide, polyurethane thickeners, styrene maleic anhydride copolymers, acrylic copolymers which comprise at least one of acid groups derived from acrylic acid, methacrylic acid, or homologues of these, salts of these acids, and amides of these acids, a natural organic thickener selected from the group consisting of proteins, and of the polysaccharides starch, arabinoxylans, chitin, and polyuronides, and modifications of these which are preferably hydrophilic, or an organic thickener which is cellulose or a cellulose derivative selected from the group consisting of hydroxyethylcellulose, carboxymethyl cellulose, hydroxy-propylmethyl cellulose, and ethylhydroxyethyl cellulose.

Catalysts used in conjunction with crosslinkers, particularly aminoplast crosslinkers, generally have acidic groups.

The coating composition thus obtained is particularly useful for protective coatings on base metals, and is preferably applied onto phosphated or zinc-phosphated steel substrates, by brushing, spraying, by applying with a doctor knife (blade coating), or by dipping. Curing is made at a temperature of at least 100° C., preferably, at least 120° C., and more preferred, at least 150° C.

The invention is further illustrated by the following examples.

The following test methods were used in the examples:

| Physicochemical Quantity | Standard |
|---|---|
| Dynamic Viscosity | DIN EN ISO 53177 (Ubbelohde) |
| | DIN EN ISO 3219 (Cone/Plate) |
| Mass Fraction of Solids (Solids content) | DIN EN ISO 3251 |
| | DIN EN ISO 55671 |
| | (foil method) |
| Specific Amount of Epoxide Groups* | ASTM D 1652-04 (Titration) |
| pH | ISO 976-2006 (Determination of pH) |
| Particle Size | DIN EN ISO 13321 |
| Heptane Compatibility Test | DIN 55955 |
| Salt Spray Test | DIN EN ISO 9227) |
| Blistering Assessment | DIN EN ISO 4628-2 |

*amount of substance of epoxide groups in a resin, divided by its mass; inverse of "Epoxy Equivalent Weight"

Example 1: Synthesis of a Resole

In a reaction vessel equipped with a thermometer, a stirrer, a reflux condenser, a descending condenser and a device for reducing the pressure, 453.6 g of n-butanol were heated up to 50° C. Then, 397.3 g of bisphenol A, 48.5 g of sodium hydroxide solution (having a mass fraction of solids of 45%), 357.6 g of aqueous formaldehyde solution (having a mass fraction of dissolved formaldehyde of 37%), and 95.4 g of paraformaldehyde were added and reacted for ten hours at 50° C. Thereafter, further 447 g of n-butanol were added, and the pH adjusted to 3.5 by adding 72.2 g of an aqueous solution of phosphoric acid (having a mass fraction of dissolved phosphoric acid of 75%). Azeotropic distillation was conducted at atmospheric pressure and a temperature of from 94° C. to 105° C. for eight hours in order to strip off the water phase. The residual n-butanol was then stripped off at 120° C. Further 212 g of n-butanol were added, followed by a second azeotropic distillation at atmospheric pressure for five hours. Remaining n-butanol was also stripped off to reach a distillation temperature of 115° C. with further water stripped off by azeotropic distillation until compatibility of the reaction mass with n-heptane was reached at a ratio of resin to n-heptane of 1:2. Salt was removed by washing the resin obtained with 187 g of deionised water. Residual water was removed by azeotropic distillation at atmospheric pressure and a temperature of 105° C. followed by the removal of all volatile components at 85° C. and a reduced pressure of 10 kPa (100 mbar). The resulting polymeric resin was dissolved in n-butanol to a solution with a mass fraction of solids of 72% (mass of sample: 1 g, drying conditions: 60 min, 125° C.) and a dynamic viscosity of 880 mPa·s at 23° C.

Example 2: Preparation of an Anionic Resin Dispersion (=Example 1 of U.S. Pat. No. 5,177,161)

2a: Synthesis of a Novolak 700 g (7.44 mol) of phenol, 4 g of maleic anhydride and 322 g of an aqueous formaldehyde solution having a mass fraction of formaldehyde of 30% [n(CH$_2$O)=3.22 mol] were mixed and boiled for three hours under reflux in a reaction vessel equipped with a thermometer, a stirrer, a reflux condenser, a descending condenser and a pump for reducing the pressure. The volatile components were then distilled off under reduced pressure until a temperature in the still of 220° C. was reached. 499 g of a polymethylenepolyphenol remained in the reaction vessel, having a viscosity of 290 mPa·s, measured at 29° C. on a solution in ethylene glycol monoethyl ether with a mass fraction of solids of 50%. The number average of the molar mass, $M_n$, as determined by gel permeation chromatography calibrated with phenolic novolak standards, was 461 g/mol.

2b: Advancement Reaction 400 g of the polymethylenepolyphenol (amount of phenolic hydroxyl groups n(OH)=3.92 mol) obtained in Example 2a were melted, 0.2 g of N,N-dimethyl-amino-1, 3-propanediamine were added under stirring, and 600 g of a type 7 epoxy resin based on bisphenol A and epichlorohydrine with a specific amount of epoxide groups of 513 mmol/kg ("epoxide equivalent weight" of 1950 g/mol; corresponding to n(EP)=0.308 mol) were incorporated into the melt. The melt was then heated under stirring to 140° C. under a nitrogen veil, and this temperature was maintained for eight hours. The softening temperature (capillary method) of the reaction product increased to 98° C. At the end of the reaction time when all epoxide groups had been consumed, the reaction product was dissolved using 600 g of n-butanol and 400 g of xylene. The solution had a viscosity of 8250 mPa·s measured at 20° C. and a shear rate of 100 s$^{-1}$.

2c: Methylolation and Carboxylation 1240 g of the resin solution obtained in Example 2b were heated to a temperature of 60° C., 72.2 g of an aqueous sodium hydroxide solution having a mass fraction of solids of 33%, and 64.4 g of an aqueous formaldehyde solution having a mass fraction of formaldehyde of 37% were added, and the resulting mixture was stirred at 60° C. until, after three hours, the mass fraction of free formaldehyde in the reaction mixture was decreased to 0.1%. Then, further 202 g of the aqueous sodium hydroxide solution as supra and 97.7 g of monochloroacetic acid were added, and the reaction mixture was stirred at 60° C. until, after four to five hours, the mass fraction of remaining sodium hydroxide was reduced to between 0.35% and 0.4%. The reaction mixture was then acidified to a pH of from 2.0 to 2.2 by addition of 245.9 g of aqueous sulfuric acid with a mass fraction of $H_2SO_4$ of 25%. After separating the lower layer of liquor and the precipitated crystals, the remaining organic layer was heated to from 75° C. to 80° C. and washed with 200 g of distilled water. After separating off the aqueous layer, the organic solution was liberated from remaining water by distillation at 80° C. under reduced pressure, and the resin solution so formed was separated from deposited solid materials by filtration. The resin solution thus obtained can be used as a binder in a solvent-borne coating composition.

2d: Hydrophilically Modified Epoxy-Based Resin Dispersion

To convert the said resin solution of 2c into a water-dilutable resin dispersion, the volatile solvents butanol and xylene were removed at a pressure of 2 kPa (20 mbar) and a still temperature of 80° C. in the course of three hours. By adding 600 g of deionised water and 83.3 g of an aqueous solution of 2-(N,N-dimethylamino)-2-methylpropanol (having a mass fraction of solute of 80%) and homogenising, 1800 g of an aqueous resin dispersion were obtained with a mass fraction of solids of 40.5% (measured at 60 min and 135° C.), having a viscosity of 240 mPa·s at 20° C., and a pH of 7.4. The dispersion contained a mass fraction of n-butanol of 6.2%, and a mass fraction of xylene of 0.1%. Free formaldehyde and phenol were below the level of detection (mass fraction of 0.02% for phenol and of 0.01% for formaldehyde in the test sample). The molar mass of the resin dispersion obtained was determined by gel permeation chromatography in the absence of the solvent in relation to a phenolic resin calibration standard. The number average molar mass $M_n$ was 1374 g/mol, the mass average molar mass $M_w$ was 12765 g/mol, and the polydispersity $M_w/M_n$ was 9.290.

Example 3: Preparation of a Resole-Modified Anionic Dispersion 4250 g of the resin dispersion from example 2 were charged into a reaction vessel equipped with a thermometer, a stirrer, a reflux condenser, a descending condenser, and a pump for reducing the pressure, and heated up to 115° C. while stripping off the solvent at 10 kPa (100 mbar). The temperature was then reduced to 100° C., and atmospheric pressure was restored. A mixture of 347 g of N,N-dimethylethanolamine and 320 g of deionised water was then added, followed by addition of 395 g of butylglycol. At 95° C., 640 g of the phenolic resin from Example 1 were added under stirring. 2.1 kg of water were then added under continued stirring over the course of nine hours and the temperature thereby reduced to 50° C. to form a phenoxy/resole dispersion having a mass fraction of solids of 46% (measured using a 2 g sample, and drying for one hour at 135° C.), a pH of 9, and a dynamic viscosity of 990 mPa·s at 23° C. The acid value determined, based on the mass of the resin dispersion, was 36 mg/g.

Example 4: Preparation of a Resole-Modified Non-Ionic Dispersion

4a: Preparation of a Hydrophilic Epoxy Resin 1 kg of polyethylene glycol PEG 4000 (average molar mass approximately 4000 g/mol) were heated to 120° C., and dissolved water was removed by distillation under reduced pressure and a flow of nitrogen. 110 g of bisphenol A diglycidylether and thereafter, 1.7 g of an aqueous solution of tetrafluoroboric acid with a mass fraction $w(HBF_4)$ in the solution of 50% were added. When a constant value of specific content of epoxide groups was reached (approximately 0.1 mol/kg to 0.2 mol/kg), 1100 g of water were added to dilute to a mass fraction of solids of approximately 50%.

4b: Advancement Reaction

Into a reaction vessel equipped with a thermometer, a stirrer, a reflux condenser, a descending condenser, and a pump for reducing the pressure, 2400 g of bisphenol A diglycidylether, 980 g of bisphenol A, and 825 g of the hydrophilic epoxy resin of Example 4a were charged and heated to 125° C. under stirring to remove all volatile components at a reduced pressure of 10 kPa (100 mbar). 1.3 g of triphenylphosphine were then added, and the temperature was further increased to 160° C. and the mixture was kept under stirring until a specific amount of epoxide groups of 1.22 mol/kg (an "epoxide equivalent weight" of 820 g/mol) was reached.

4c: Addition of Resole and Dispersion in Water

The reaction mass was then cooled down to 120° C., and 1511 g of the phenolic resin from Example 1 was added. By distillation at 105° C. and 10 kPa (100 mbar), the solvent was removed from the reaction mass. The viscosity was then reduced by adding 550 g of methoxypropanol, and solution was cooled to 80° C. 1300 g of deionised water were then added to the reaction vessel, and the mixture was dispersed for three hours at 70° C. to get a water-dilutable resin dispersion. Further 4200 g of deionised water were added to the vessel over the course of two hours, and finally the mass fraction of solids was adjusted by adding further deionised water to 42% (sample of 1 g, dried at 125° C. for 10 min), decreasing the viscosity to 350 mPa·s (measured at 23° C., with a shear rate of 100 $s^{-1}$). The resulting Z-average particle size of the phenoxy/resole dispersion was 990 nm, and the pH was 6.5.

Example 5: Formulation and Application of Anticorrosive Clearcoats

The components from Table 1 were mixed in the given sequence in a laboratory blender. Twenty-four hours after blending the the resultant coating compositions were applied onto Zn-phosphated steel plates (Gardobond® 26S 6800 OC) by drawing down a wet film thickness of 80 μm (0.080 mm). After ten minutes of flash off at 23° C. the coated plates were cured for ten minutes at 180° C. The dry film thicknesses of the coatings are given in Table 1.

TABLE 1

Mass of Constituents of the Coating Compositions 1 to 6 in g

| | Coating Composition | | | | | |
|---|---|---|---|---|---|---|
| | 1 | 2* | 3** | 4 | 5* | 6** |
| Anionic dispersion (Ex. 3) | 80.94 | 80.94 | 80.94 | 80.94 | 80.94 | 80.94 |
| Deionised water | 7.49 | 7.49 | 7.49 | 7.49 | 7.49 | 7.49 |
| Hexylglycol | 5.04 | 5.04 | 5.04 | 5.04 | 5.04 | 5.04 |
| n-Butanol | 1.45 | 1.45 | 1.45 | 1.45 | 1.45 | 1.45 |
| Catalyst[1] | 0.18 | 0.18 | 0.18 | 0.18 | 0.18 | 0.18 |
| levelling agent[2] | 0.96 | 0.96 | 0.96 | 0.96 | 0.96 | 0.96 |
| aminoplast crosslinker [3] | 3.64 | 3.64 | 3.64 | 3.64 | 3.64 | 3.64 |

TABLE 1-continued

Mass of Constituents of the Coating Compositions 1 to 6 in g

| | Coating Composition | | | | | |
|---|---|---|---|---|---|---|
| | 1 | 2* | 3** | 4 | 5* | 6** |
| defoamer[4] | 0.60 | 0.60 | 0.60 | 0.60 | 0.60 | 0.60 |
| thickener[5] | | | | 2.01 | 2.01 | 2.01 |
| Deionised water | 16.51 | 8.26 | | 16.51 | 8.26 | |
| β-hydroxy-alkylamide[6] | | 8.26 | 16.51 | | 8.66 | 17.31 |
| Dry film thickness | 15 μm | 15 μm | 15 μm | 15 μm | 15 μm | 15 μm |

[1] prepared by neutralising 10 g of a solution of dodecylbenzene sulfonic acid (mass fraction 72%, in isopropanol) by addition of 2.1 g of N,N-dimethylethanolamine
[2] Additol ® XW 395 (Allnex Austria GmbH), water-borne, silicone-free, amine-neutralised acrylic copolymer
[3] Cymel ® 303 LF (Allnex Austria GmbH), highly methylated melamine crosslinker with a mass fraction of approximately 59% of monomeric species
[4] Additol ® VXW 6397 (Allnex Austria GmbH), defoamer based on mineral oil and hydrophobic solid particles
[5] Viscalex ® HV 30 (rheology modifier, BASF SE), hydrophobic alkali swellable acrylic copolymer emulsion (acid value: 70 mg/g based on the mass of the emulsion)
[6] Primid ® XL 552 (Ems Chemie AG), N,N,N',N'-tetrakis-(2-hydroxyethyl)adipamide, aqueous solution with mass fraction of solute of 50%
*the concentration of β-hydroxyalkylamide crosslinker was chosen such that the ratio between the amount n(—COOH) of carboxylic acid groups (measured by acid value determination of the dispersion including all additives) and the amount n(HO-alkyl-N<) of hydroxyalkylamide groups was 1 mol:1 mol
**the concentration of β-hydroxyalkylamide crosslinker was chosen such that the ratio between the amount n(—COOH) of carboxylic acid groups (measured by acid value determination) and the amount n(HO-alkyl-N<) of hydroxyalkylamide groups was 1 mol:2 mol.

Example 6: Anti-Corrosion Performance

After seven days of conditioning at 23° C. and 50% relative humidity, three individual coated panels of each formulation from Example 5 were scratched in the middle of the panel and exposed to salt spray chamber test (DIN EN ISO 9227). Blistering of the artificially aged panels was documented according to DIN EN ISO 4628-2 (amount of blisters: m/size of blisters: s) and delamination from the scratch (degree d of delamination measured as d=(d1−w)/2 where d1 is the overall width of the zone of delamination, and w is the width of the original scribe or scratch) was documented according to DIN EN ISO 4628-8. Table 2 shows the results: blistering (B) measured after certain exposure time, measured in hours, in the salt spray test chamber, and delamination expressed as the degree d of delamination in the coating film at scratch after a certain exposure time measured in hours.

TABLE 2

Test Results for Coatings

| exposure time | Coating Number | | | | | |
|---|---|---|---|---|---|---|
| | 1 | 2 | 3 | 4 | 5 | 6 |
| B; 504 h | m2/s1 to 3 | no blisters | no blisters | m1/s3 to 4 | no blisters | no blisters |
| B; 768 h | m2 to 3/s2 to 3 | f | f | m3/s3 to 5 | m0 to 1/s1 | f |
| d; 768 h | 25 mm | 10 mm | 8 mm | 30 mm | 6 mm | 2 mm |
| B; 1344 h | m5/s3 to 5 | m0 to 1/s1 (Scratch: m1/s2) | f | m5/s5 | m1 to 2/s2 to 3 | m1/s1 to 2 | f: only few small blisters along scratch

It was clearly demonstrated that the addition of a β-hydroxyalkylamide to the anticorrosion clearcoat where the amount of substance of hydroxyalkylamide groups is equal to the amount of substance of carboxylic acid groups present in the binder resin and in the rheology modifier significantly improves the anti-corrosive effect of the clearcoat. An even higher amount of a β-hydroxyalkylamide (twice the amount of substance of carboxylic acid groups) further improves the anti-corrosive effect.

Example 7: Synthesis of an Epoxy-Ester Based on Phosphoric Acid

Into a reaction vessel equipped with a thermometer, a stirrer and a reflux condenser, 76 g of methyl ethylketone, 26 g of isopropanol and 190 g of bisphenol A diglycidylether were added, and the mixture was homogenised at 35° C. In another vessel equipped with a thermometer, a stirrer and a reflux condenser, 26 g of phosphoric acid (aqueous solution with a mass fraction of phosphoric acid of 75%), 7 g of isopropanol and 23 g of methylethylketone were mixed and heated to 50° C. The mixture from the first vessel was added to the mixture of the second vessel over the course of 5 hours at a temperature between 50° C. and 55° C. The temperature was maintained until a specific epoxide group content of below 0.1 mol/kg was reached. The resin was then further diluted with isopropanol to a mass fraction of solids of 66%, and held at a temperature of 80° C. until reaching a final acid value of 88 mg/g, based on the mass of solid resin.

Example 8: Synthesis of an Anionic Epoxy/Resole Dispersion

Into a reaction vessel equipped with a thermometer, a stirrer, a reflux condenser, a descending condenser and a device for reducing the pressure, 31.5 g of bisphenol A diglycidylether, 12.5 g of bisphenol A, and 2.8 g of a dimer fatty acid (acid value 190 mg/g) were added and heated to 120° C. 0.05 g of triphenylphosphine were then added, and the temperature was further increased to 150° C. until a specific amount of epoxide groups in the resinous reaction product of 1 mol/kg was reached ("epoxy equivalent weight" of 1000 g/mol). 6.45 g of Texanol® (a mixture comprising mainly 2,2,4-trimethyl-1,3-pentanediol monoisobutyrate, Eastman Chemical Company) and 11.7 g of methoxypropanol were added, and the mixture was cooled to 100° C. 41.3 g of the epoxy ester from Example 7 were then added, and the solvent was removed by distillation under reduced pressure. The acid value was found to be 19 mg/g. 32.7 g of the phenolic resin from Example 1 were added, and the resulting mixture was cooled to 80° C. Then, a mixture of 2.7 g of dimethylethanolamine and 7 g of deionised water was added and stirred in for fifteen minutes. Over the course of one hour, 100 g of deionised water were added to the resin without further heating to obtain a water based epoxy resin/resole dispersion with a solids content of 44.2%, a dynamic viscosity of 850 mPa·s (shear rate 100 $s^{-1}$), a pH of 8.8 and a Z average particle size of 150 nm.

Example 9: White Monocoat Based on Non-Ionic Phenoxy/Resol Dispersion

White pigmented coating compositions were prepared according the recipe of the following table, where masses of the constituents are given:

TABLE 3

| | Coating Composition Number | | |
|---|---|---|---|
| | 7 | 8 | |
| Phenoxy/resole dispersion | 50.00 g | 50.00 g | From Example 4 |
| Pigment Paste | 35.26 g | 35.26 g | see below table 4 |
| Additol ® VXW 6503N | 0.47 g | 0.47 g | Silicone based wetting additive (Allnex Austria GmbH) |
| Additol ® VXW 6393 | 0.95 g | 0.95 g | Mineral oil based defoamer (Allnex Austria GmbH) |
| Rheovis ® HS 1152 | 1.89 g | 1.89 g | Acrylic HASE thickener (acid number 90 mg/g, based on form of delivery; BASF SE) |
| Primid ® XL 552* | 0.70 g | | N,N,N',N'-Tetrakis(2-hydroxyethyl)-adipamide (Ems Chemie AG) |
| dipropyleneglycol butylether | 2.50 g | 2.50 g | |
| deionised water | 5.00 g | 5.00 g | |

*dissolved in water, mass fraction of solute: 50%

TABLE 4

| Pigment Paste (dispersed in water on a bead mill) | | |
|---|---|---|
| Additol ® VXW 6208 | 6.40 g | Dispersing Additive (Allnex Austria GmbH) |
| Kronos ® 2190 | 102.35 g | Titanium Dioxide Pigment (Kronos International, Inc.) |
| Nubirox 102 | 14.35 g | Organophilised Zinc Phosphate and Zinc Molybdate (Ferro Corp.) |
| Blanc fixe micro | 13.05 g | Barium Sulphate (Solvay S.A.) |
| Talc | 29.35 g | Microtalc IT extra (Mondo Minerals B.V.) |
| Deionised water | 40.00 g | |

The components as mentioned in Table 3 were mixed in the given sequence with a laboratory blender. Twenty-four hours after blending the coatings were applied onto Zn-phosphated steel plates (Gardobond 26S 6800 OC) by drawing down. After ten minutes of flash off at 23° C., the coated plates were cured for ten minutes at 180° C. The dry film thickness of the coatings was 25 μm (0.025 mm) in each case.

Example 10: Anti-Corrosion Performance

After seven days of conditioning at 23° C. and 50% relative humidity, the coated panels of each formulation from Example 9 were scratched in the middle of the panel and exposed to salt spray chamber test ("SST"; DIN EN ISO 9227). Blistering of the artificially aged panels was documented according to DIN EN ISO 4628-2 and delamination from the scratch was documented according to DIN EN ISO 4628-8.

TABLE 5

| Blistering after Exposure to Salt Spray Test | | |
|---|---|---|
| | Coating Composition | |
| | 7 | 8 |
| Blistering after 504 hours SST | No blisters, corrosion on the scribe only | No blisters, corrosion on the scribe only |
| Blistering after 1175 hours SST | No blisters, corrosion on the scribe only | Blistering on the scribed as well as the unscribed area |

It was clearly demonstrated that the addition of a β-hydroxyalkylamide to the anticorrosion monocoat significantly improves the anti-corrosive effect.

The invention claimed is:

1. An aqueous resin dispersion D comprising a mixture of a hydrophilically modified epoxy-based resin P and a resole R, and a co-crosslinker E, wherein the hydrophilically modified epoxy-based resin P is made in a reaction or a sequence of reactions which includes at least one step where an advancement reaction is conducted,
wherein the hydrophilically modified epoxy-based resin P is a non-ionically modified epoxy-based resin Pn,
wherein the non-ionically modified epoxy-based resin Pn is made by
synthesizing an emulsifier F which has a nonionic portion which comprises a polyoxyethylene homopolymer or copolymer segment or a sugar alcohol segment, and a non-hydrophilic and compatibilising portion which comprises building blocks derived from epoxide compounds which are at least difunctional, by coupling of the at least difunctional epoxide compounds with hydroxy-functional polyoxyethylene homopolymers or hydroxy-functional polyoxyethylene copolymers or with sugar alcohols catalysed with strong Brønsted acids or Lewis acids, or with epoxide-functional polyoxyethylene homopolymers or epoxide-functional polyoxyethylene copolymers or with epoxide-functional sugar alcohols, and
incorporation of the emulsifier F into an epoxy resin via an advancement reaction with a diepoxide A1, a dihydric aromatic compound A2, and the emulsifier F, in the presence of a phosphine or amine catalyst, wherein the stoichiometry is chosen such that the advancement reaction product has epoxide end groups, and
wherein the co-crosslinker E is selected from the group consisting of
a compound E1 having at least two hydroxyl groups that react with acid compounds present in a coating composition at elevated temperature above 80° C. under ester formation and liberation of water, and
an ester E2 with at least two ester groups formed by an at least dihydric alcohol E22 and an acid E21 which acid is unstable at elevated temperature above 80° C.

2. The aqueous resin dispersion D of claim 1, wherein the co-crosslinker E1 is a β-hydroxyalkylamide of an aliphatic dicarboxylic acid having at least two β-hydroxyalkylamide groups.

3. The aqueous resin dispersion D of claim 1, wherein the hydrophilically modified epoxy-based resin P is an externally emulsified epoxy-based resin which comprises added emulsifiers.

4. The aqueous resin dispersion D of claim 1, wherein the resole R is based on a dihydric phenol.

5. A process for the preparation of the aqueous resin dispersion D of claim 1, which process comprises the steps of
preparation of the resole R by reaction of a phenol compound having at least one phenolic hydroxyl group, and formaldehyde in stoichiometric excess, under alkaline catalysis and heating,
mixing the resole R and the hydrophilically modified epoxy-based resin P,
dispersing the mixture of the resole R and the hydrophilically modified epoxy-based resin P thus obtained in water, and
adding to the mixture thus obtained, the co-crosslinker E.

6. A coating composition, comprising the aqueous dispersion D according to claim 1, and additives selected from the group consisting of defoamers, levelling agents, coalescence agents, flow modifiers, biocides, pigments, wetting agents, and rheology additives.

7. The coating composition of claim 6, further comprising an aminoplast crosslinker and an acid catalyst therefor.

8. The coating composition of claim 6, which comprises a rheological additive.

9. The coating composition of claim 8, wherein the rheological additive is an inorganic thickener selected from the group consisting of silica and layer silicates, both of which may be organically modified, an organic synthetic thickener selected from the group consisting of polyvinyl alcohols, polyacrylamides, polyvinyl pyrrolidone, polyethylene oxide, polyurethane thickeners, styrene maleic anhydride copolymers, acrylic copolymers which comprise at least one of acid groups derived from acrylic acid, methacrylic acid, or homologues of these, salts of these acids, and amides of these acids, a natural organic thickener selected from the group consisting of proteins, and of the polysaccharides starch, arabinoxylans, chitin, and poly-uronides, and modifications of these, or a thickener which is cellulose or a cellulose derivative selected from the group consisting of hydroxyethyl-cellulose, carboxymethyl cellulose, hydroxypropylmethyl cellulose, and ethyl-hydroxyethyl cellulose.

10. A method of forming a coating layer on a substrate which is a base metal, comprising the steps of applying the coating composition of claim 6 onto the said substrate, by brushing, spraying, blade coating, or dipping, and curing the coated substrate by heating to a temperature of at least 100° C.

* * * * *